United States Patent [19]

Morishita

[11] Patent Number: 5,033,042
[45] Date of Patent: Jul. 16, 1991

[54] OPTICAL APPARATUS FOR OPTICAL PICKUP

[75] Inventor: Ichiro Morishita, Iwanuma, Japan

[73] Assignee: Alps Electric Co., Ltd., Tokyo, Japan

[21] Appl. No.: 515,762

[22] Filed: Apr. 13, 1990

Related U.S. Application Data

[63] Continuation of Ser. No. 141,325, Jan. 6, 1988, abandoned.

[30] Foreign Application Priority Data

Apr. 24, 1987 [JP] Japan ................................ 62-101489

[51] Int. Cl.$^5$ .............................................. G11B 7/00
[52] U.S. Cl. .................................................. 369/112
[58] Field of Search ............... 369/109, 112, 116, 120, 369/121, 122, 44.23; 250/201.5

[56] References Cited

U.S. PATENT DOCUMENTS

| | | | |
|---|---|---|---|
| 4,333,173 | 6/1982 | Yonezawa et al. | 369/122 |
| 4,530,082 | 7/1985 | Howe et al. | 369/112 |
| 4,532,619 | 7/1985 | Sugiyama et al. | 369/112 |
| 4,564,931 | 1/1986 | Ohara et al. | 369/122 |
| 4,616,356 | 10/1986 | Wilkinson | 369/116 |
| 4,656,348 | 4/1987 | Ando | 369/45 |
| 4,689,780 | 8/1987 | Ohara et al. | 369/112 |
| 4,744,073 | 5/1988 | Sugiki | 369/112 |
| 4,773,052 | 9/1988 | Sugiura et al. | 369/46 |
| 4,789,978 | 12/1988 | Shikama et al. | 369/112 |

Primary Examiner—Donald McElheny, Jr.
Attorney, Agent, or Firm—Guy W. Shoup; Norman R. Klivans

[57] ABSTRACT

An optical apparatus of an optical pickup including a semiconductor laser, a collimate lens to obtain a parallel light from a laser beam emitted from said semiconductor laser, an objective for collecting on a recording surface of an optical disk the parallel light obtained through the collimate lens, and a light receiving element for detecting a reflection light reflected on the recording surface of the optical disk wherein a numeric aperture NA of said collimate lens is set as $0.14 < NA < 0.2$.

3 Claims, 5 Drawing Sheets

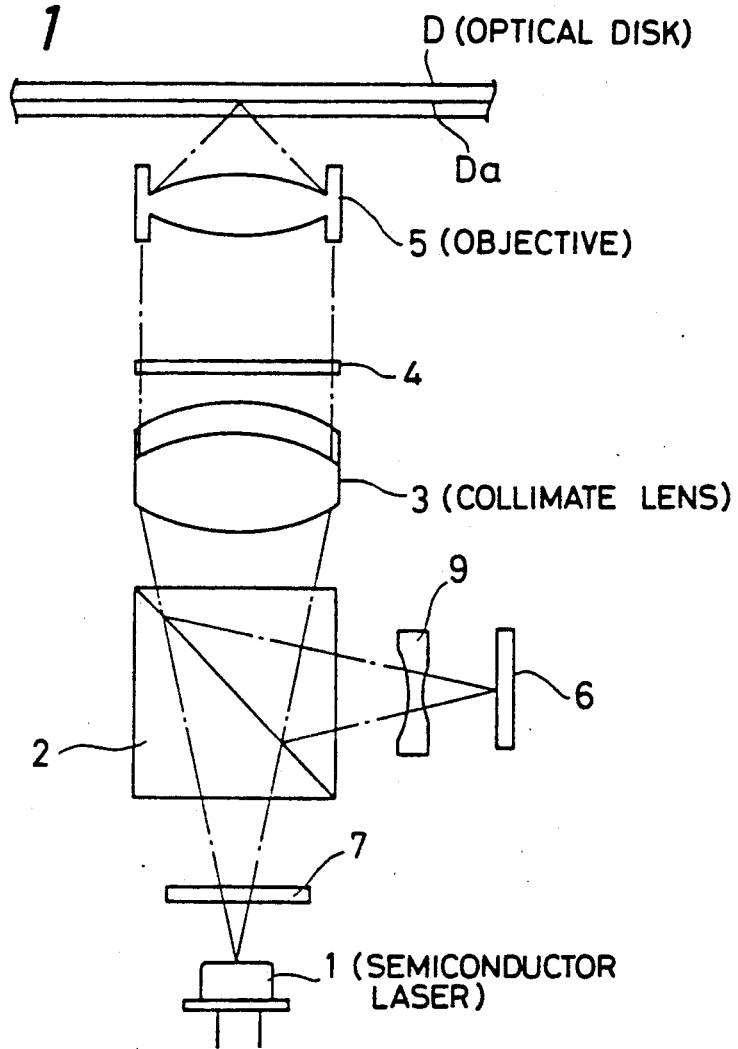
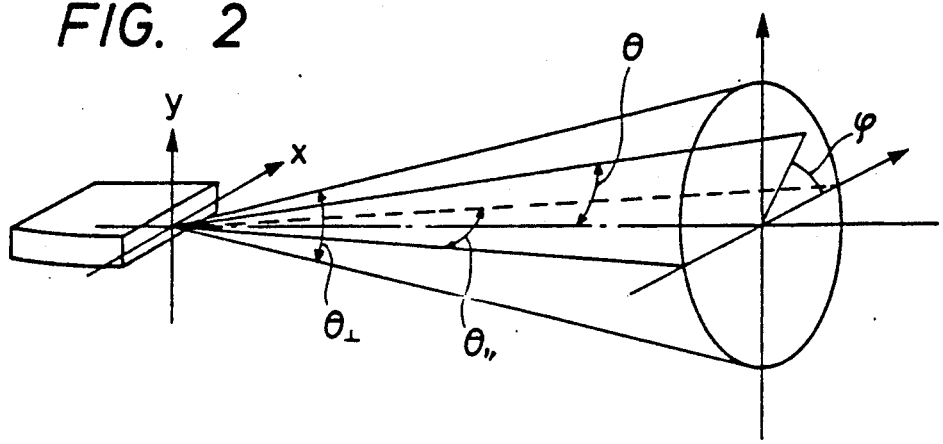

OPTICAL APPARATUS FOR OPTICAL PICKUP

This application is a continuation of application Ser. No. 07/141,325, filed Jan. 6, 1988, abandoned.

BACKGROUND OF THE INVENTION

1. Field of the Invention

The present invention relates to an optical pickup for use with a compact disk player, a video disk player, or an optical disk memory apparatus, and in particular, to an optical apparatus capable of preventing a crosstalk between adjacent tracks on a recording surface of a disk without using an apodized filter.

2. Description of the Prior Art

FIG. 5 is a schematic diagram showing an arrangement of elements in an optical apparatus of an optical pickup for a conventional video disk player.

A laser beam emitted from a semiconductor laser 1 passes through a polarized beam splitter 2 and then travels through a collimate lens 3 to be collimated to a parallel light, which is then collected by an objective 5 so as to form a fine spot on a recording surface Da of an optical disk D. A diffraction grid 7 is disposed in a light path of the laser beam so as to attain three spots associated with the laser beam on the recording surface Da of the optical disk D. A reflection beam reflected from the optical disk D passes through a ¼ wavelength plate 4 and then is reflected by the polarized beam splitter 2 to a direction having a right angle with respect to the incident direction of the laser beam; thereafter, the resultant beam passes through a light receiving lens 9 and is then detected by a light receiving element 6 such as a photodiode. The light receiving element 6 reads an RF signal recorded in a form of pits on the recording surface Da of the optical disk D.

In FIG. 6, reference numeral 8 indicates an apodized filter, which is integrally structured with a diffraction grid 7. The apodized filter 8 includes a transparent plate 8a at a central portion thereof, the plate 8a being transparent with respect to the beam and a semi-transparent plates 8b respectively disposed on both sides of the transparent plate 8a.

FIG. 7A shows a distribution of the amount of light of a laser beam incident to the objective 5 in a case where the apodized filter 8 is not provided; whereas FIG. 8A is a graph depicting a distribution of the amount of light of a laser beam incident to the objective 5 in a case where the apodized filter 8 is provided. In addition, FIG. 7B shows a distribution of the amount of light of a beam spot formed on the recording surface Da of the optical disk in a case where the apodized filter B is not provided: whereas FIG. 8B is a schematic diagram illustrating a distribution of the amount of light of a beam spot formed on the recording surface Da of the optical disk in a case where the apodized filter 8 is provided When the apodized filter 8 is not disposed, due to the diffraction phenomenon of the beam passed through the diffraction grid 7, a spot $K_1$ is formed around a main spot $K_0$ of the beam due to the primary diffraction as shown in FIG. 7B. Consequently, when the main spot $K_0$ is scanning a track $T_2$, there possibly occurs a case where the spot $K_1$ associated with the primary diffraction covers pits of the adjacent tracks $T_1$ and $T_3$ respectively disposed on the right and left. In an apparatus such as a video disk player, since information is recorded in a form of analog signals, when the spot $K_1$ associated with the primary diffraction covers the adjacent tracks $T_1$ and $T_3$, a crosstalk possibly occurs and the signal-to-noise (S/N) ratio is deteriorated in reproduction of the RF signal; consequently, there arises a phenomenon such as an occurrence of a noise in the screen.

When using the apodized filter 8, as shown in FIG. 6, the quasi-transparent plates 8b (with transmittivity of 50%, for example) restricts the light amount in the both sides of the effective portion 10 of the laser beam; consequently, as shown in FIG. 8A, of the laser beam incident to the objective 5, the amount of light on the right and left sides thereof is reduced. As a result, as shown in FIG. 8B, the beam spot associated with the primary diffraction is prevented from being formed in the beam spot attained on the recording surface Da of the optical disk D.

However, in the conventional optical apparatus of FIG. 5, when an apodized filter 8 is disposed as means to lower the intensity level of the spot due to the primary diffraction, the number of parts constituting the optical section is increased by the elements of the apodized filter 8 and hence the cost is increased.

Moreover, when the apodized filter 8 is employed, the numerical aperture of the objective 5 is substantially varied because of the quasi-transparent plates 8b; as a result, the diameter of the spot φ of FIG. 8B is increased and the intensity level of the spot is lowered. The decrease in the intensity level of the spot causes lowering of the detection level of the light receiving element 6, and the increase in the spot diameter φ lowers the degree of modulation.

Furthermore, the utilization of the apodized lens leads to an increase of the aberration associated with the quasi-transparent plates 8b.

SUMMARY OF THE INVENTION

It is therefore an object of the present invention to provide an optical apparatus of an optical pickup which prevents an occurrence of a crosstalk between adjacent tracks on a recording surface of an optical disk without employing an apodized filter and without adding other new optical elements and which is capable of increasing the spot intensity as compared with a case where an apodized filter is used, thereby removing the problems of the prior-art technology.

According to the present invention, there is provided an optical apparatus including a semiconductor laser, a collimate lens collimating the laser beam emitted from the semiconductor lens to obtain a parallel light, an objective for collecting onto a recording surface of an optical disk the parallel light attained by the collimate lens, and a light receiving element for detecting light reflected from the recording surface of the optical disk wherein said collimate lens has a numerical aperture NA as $$0.14 < NA < 0.2$$

According to the present invention, in a case where the emission angle in which the laser beam is emitted from the semiconductor laser, an angle $\theta_{11}$ corresponds to a direction of the laser beam intersecting the tracks on the recording surface of the optical disk, the numerical aperture NA is set to be greater than $\sin(\theta_{11}/2)$. This provision enables the amount of light of the parallel beam passing through the collimate lens to develop a distribution similar to the Gaussian distribution. When the parallel light beam having a distribution of the amount of light similar to the Gaussian distribution is incident to the objective, the level of the amount of light of the spot associated with the primary diffraction can be lowered in almost the similar fashion as the case where the apodized filter is employed. Furthermore, when the numerical aperture NA of the collimate lens is made to be greater, the level of the amount of light can be greatly reduced in the main spot formed on the recording surface of the optical disk as compared with the case where the apodized filter is employed. In addition, if the numerical aperture NA of the collimate lens is increased without any limit, the diameter of the main spot becomes too great and hence the degree of modulation becomes higher; numerical aperture NA.

BRIEF DESCRIPTION OF THE DRAWINGS

The present invention will be apparent from the following detailed description in conjunction with the accompanying drawings in which:

FIG. 1 is a schematic diagram showing an arrangement of elements in an optical apparatus of an optical pickup according to the present invention;

FIG. 2 is an explanatory diagram useful to explain an emission state of a laser beam from a semiconductor laser employed to effect computation;

FIGS. 4A-4B show, for a comparison with the conventional technology, a case employing an apodized filter as in a conventional system in which FIG. 4A is a graph depicting relationships between a ratio of the dimension of the transparent plate of the apodized filter with respect to the effective diameter of the light beam and the level of the beam spot due to the primary diffraction and FIG. 4B is a graph depicting relationships between a ratio of the dimension of the transparent plate of the apodized filter with respect to the effective diameter of the light beam and the level of the main spot formed on a recording surface of an optical disk, as well as the spot diameter at a level of $1/e^2$;

DESCRIPTION OF THE PREFERRED EMBODIMENTS

Figure 3A:
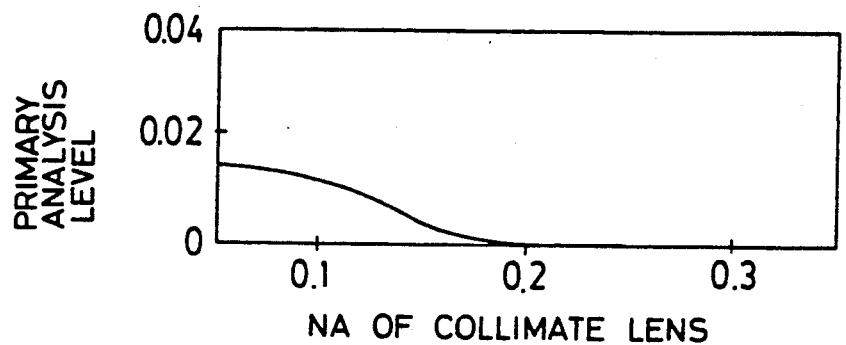
FIG. 3A is a graph schematically showing relationships between the numerical aperture of the collimate lens and the level of the spot formed by the primary diffraction on a recording surface of an optical disk.

Referring now to the drawings, description will be given of an embodiment of the present invention.

FIG. 1 is a schematic diagram showing an arrangement of elements in an optical apparatus of an optical pickup mounted, for example, in a video disk player.

The configuration of FIG. 1 includes a semiconductor laser 1, a polarized beam splitter 2, a collimate lens 3, a ¼ wavelength plate 4, an objective 5, a light receiving element 6 such as a photodiode, a diffraction grid 7, and a light receiving lens 9. The collimate lens 3 has a numerical aperture NA ranging from 0.14 to 0.2.

Figure 3B:
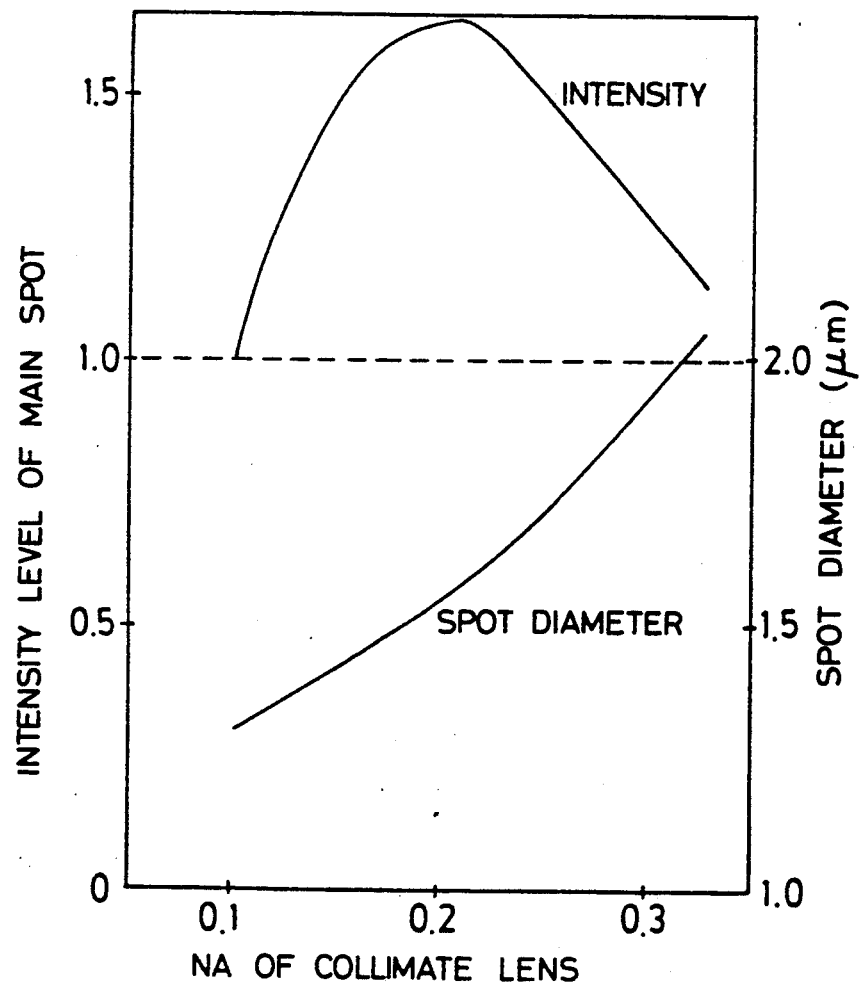
FIG. 3B is a graph schematically illustrating relationships between the numerical aperture of the collimate lens and the intensity level of the main spot formed on a recording surface of an optical disk as well as the spot diameter at a level of $1/e^2$.
Figure 7A:
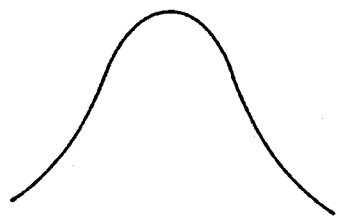
FIG. 7A is a graph schematically showing a distribution of the amount of light in a laser beam incident to the objective when the apodized filter is not provided.
Figure 7B:
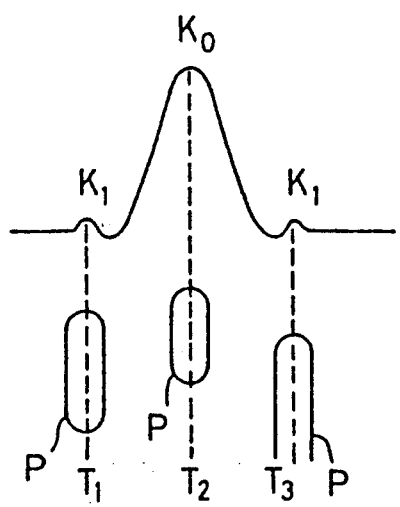
FIG. 7B is a graph schematically showing a distribution of the amount of light in a beam spot formed on a recording surface of an optical disk when the apodized filter is not provided.
Figure 8B:
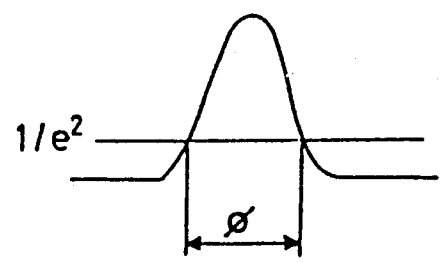
FIG. 8B is a graph schematically showing a distribution of the amount of light in a beam spot formed on a recording surface of an optical disk when the apodized filter is provided.

The range of the numerical aperture NA of the collimate lens 3, namely, $0.14 < NA < 0.2$ is attained from the graphs of FIGS. 3A-3B. FIG. 3A shows relationships between the numerical aperture NA of the collimate lens 3 and the level of the spot (see also $K_1$ of FIG. 7B) formed by the primary diffraction on a recording surface Da of an optical disk D; whereas FIG. 3B shows relationships between the numerical aperture NA of the collimate lens 3 and the intensity level of the main spot formed on the recording surface of the optical disk as well as the spot diameter at a level of $1/e^2$.

Figure 4A:
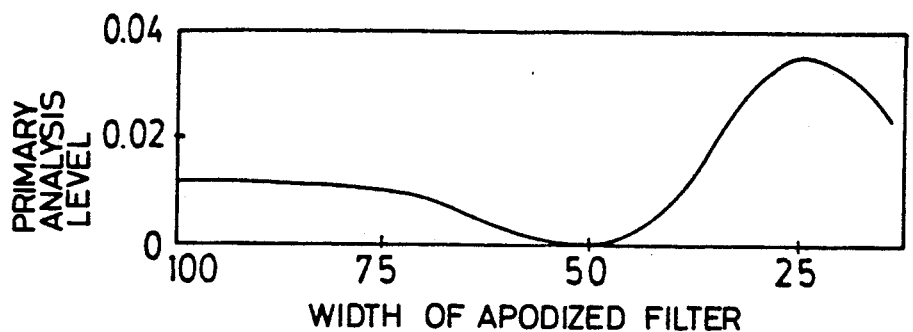
Figure 4B:
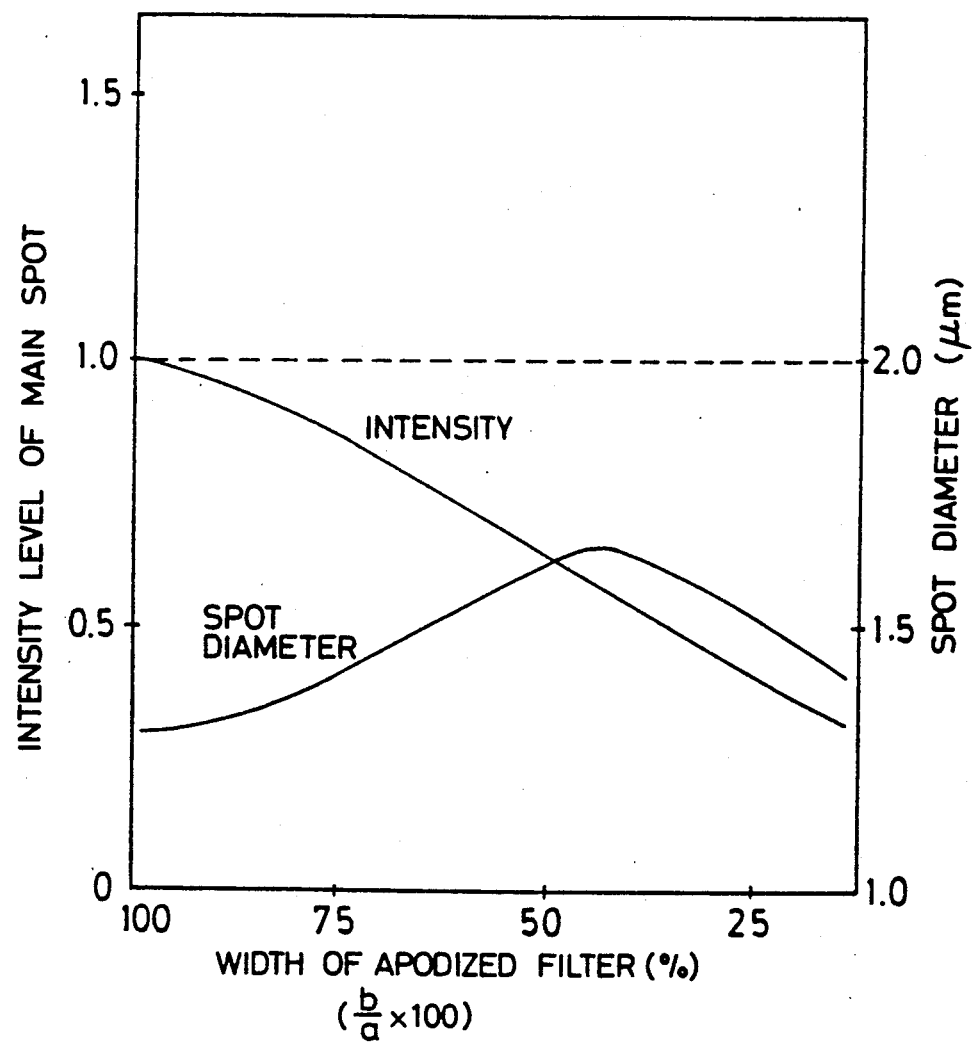
Figures 5, 6:
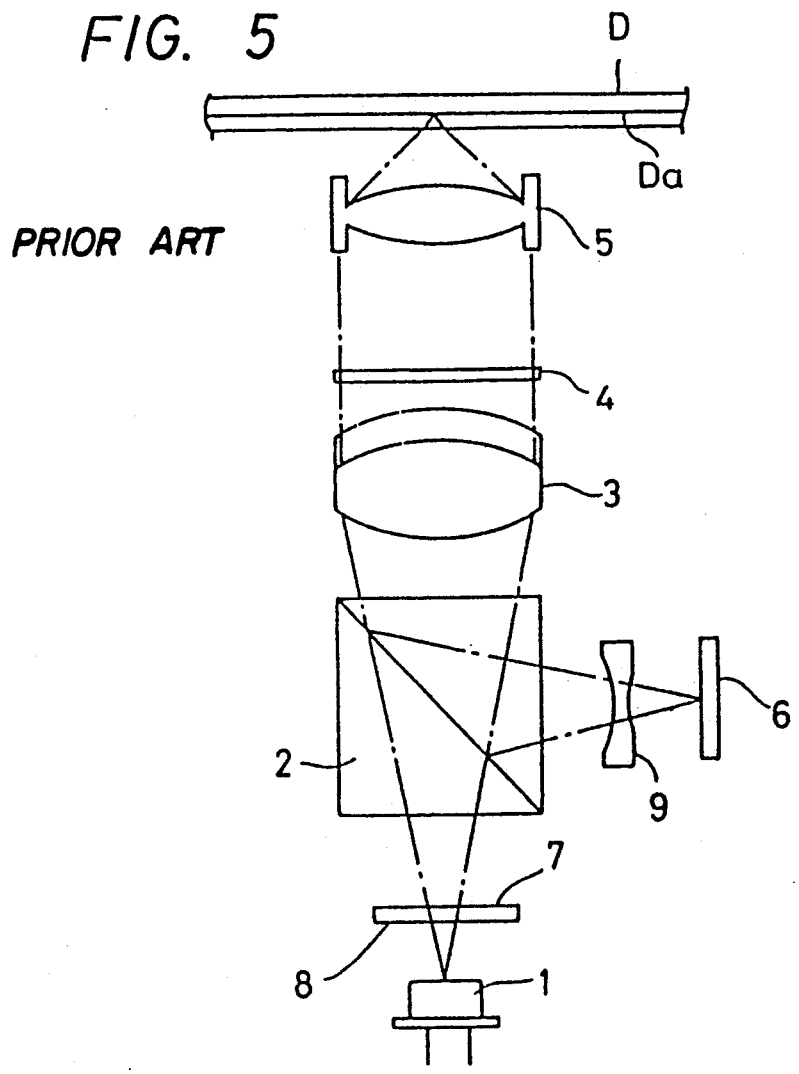
FIG. 5 is a diagram schematically showing an arrangement of elements in an optical apparatus of a conventional optical pickup.
FIG. 6 is a plan view depicting an apodized filter.
Figure 8A:
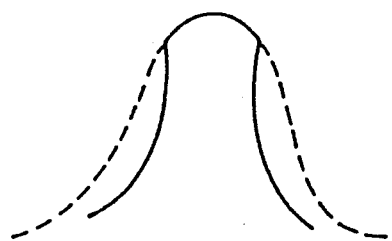
FIG. 8A is a graph schematically showing a distribution of the amount of light in a laser beam incident to the objective when the apodized filter is provided.

In addition, FIGS. 4A-4B are graphs, for a comparison with a conventional system, showing a case where an apodized filter is used. FIG. 4A shows relationships between a ratio ($b/a \times 100$ in FIG. 6) of the dimension of the transparent plate of the apodized filter with respect to the effective diameter of the light beam and the level of the spot due to the primary diffraction. Furthermore, FIG. 4B shows relationships between a ratio of the dimension of the transparent plate of the apodized filter with respect to the effective diameter of the light beam and the intensity level of the main spot formed on the recording surface of the optical disk as well as the spot diameter at a level of $1/e^2$.

Each graph above is attained as a result of a simulation. For the graphs, description will be given of computation expression used to effect the simulation of the intensity level of the main spot of FIGS. 3B and 4B.

1. Far-field pattern (FFP) of the semiconductor laser

The dependence of the distribution of the intensity of the laser beam on the emission angle is given as follows if the FFP conforms to the Gaussian distribution. In the expression, $\theta_{11}$, $\theta_\perp$, $\theta$, and $\psi$ are angles respectively indicated in FIG. 2. As shown in FIG. 2, $\theta_{11}$ conventionally denotes the angular width of the light beam in the x-direction (horizontal) at the point of intensity corresponding to half the maximum intensity. Also conventionally, $\theta_\perp$ denotes the angular width of the light beam in the y-direction (vertical) at the point of intensity corresponding to half the maximum intensity.

$$P(\theta, \psi) = P_0 \cdot \exp[-(4 \cdot \ln 2) \cdot \theta^2 / (\theta_{\frac{1}{2}}(\psi))^2] \quad (1)$$

where, $$\theta_{\frac{1}{2}}(\psi) = \theta_{11} \cdot \theta_\perp / \sqrt{(\theta_{11} \sin \psi)^2 + (\theta_\perp \cos \psi)^2} \quad (2)$$

In the expression above, $P_0$ designates the intensity of the laser light emitted into a unitary solid angle in a direction of the optical axis of the semiconductor laser.

Furthermore, the distribution of amplitude is attained from the expression (1) as follows.

$$U(\theta,\psi) = \sqrt{P_0} \cdot \exp[-2 \cdot (\ln 2) \cdot \theta^2/(\theta_{\frac{1}{2}}(\psi))^2]$$

2. Computation of the amplitude distribution of the spot image formed on a recording surface of an optical disk Assuming that the amplitude distribution, immediately before the objective, of the laser light incident to the objective is C'(x,y), $$C'(x,y) = C(x,y) \cdot |P(x,y) \cdot \exp[-j \cdot (\pi/\lambda b)(x^2+y^2)]$$

where, $|P(x,y)$ is the so-called pupil function and is represented as:

$$|P(x,y) = P(x,y) \cdot \exp[j \cdot k \cdot W(x,y)]$$

In the expression above, $|P(x,y)$ takes 1 in a case of $(x^2+y^2) \leq a^2$ and 0 in other cases. $W(x,y)$ designates a wave surface aberration, $\lambda$ indicates the wavelength of the laser light, and f is the focal distance of the objective.

Furthermore, assuming that the amplitude distribution on a plane apart by f from the emitting pupil is C''(x',y), which is represented as follows according to the Fresnel approximation.

$$C''(x',y') = \{\exp[jkf]/jf\lambda\} \cdot \exp[j(\pi/f\lambda)(x'^2 + y'^2)] \cdot \quad (3)$$

$$\int\int_{-\infty}^{\infty} C(x,y) \cdot |P(x,y) \cdot \exp[-j \cdot (2\pi/f\lambda) \cdot (xx' + yy')]dxdy$$

This expression (3) if f is the focal distance of the objective, represents the amplitude distribution of the spot at a focal position of the objective.

For effecting a computation of the expression (3), the fast Fourier transform is used and the square of the amplitude distribution represents the intensity distribution.

3. Compare the graphs respectively of FIGS. 3B and 4B

In the computation of Section 1 above, if the FFP of the semiconductor laser is received by the collimate lens 3, the intensity distribution of the collimated light can be obtained from the expressions (1) and (2).

Moreover, when employing the apodized filter, a portion of the intensity distribution computed from the expressions (1) and (2) is assumed to be associated with, for example, a half of the light amount depending on the transmissivity of the quasi-transparent plate.

Based on the intensity distribution of the collimated light thus attained, the Fourier transform is effected thereon by use of the expression (3) so as to calculate the spot intensity. The calculated values of the spot intensity are plotted in the graphs of FIGS. 3B and 4B. Incidentally, $\theta_{11}$ and $\theta_1$ are respectively assumed to be 9° and 35° in the computation for the graphs.

The numerical aperture due to the angle which constitutes the emission angle of the laser beam from the semiconductor laser 1 and which is related to the spot diameter in a direction where the laser beam intersects the tracks on the recording surface of the optical disk is $\sin(9/2)°$, namely 0.07846 if $\theta_{11}$ is 9°. As shown in FIG. 3A, when the numerical aperture NA of the collimate lens 3 is set to a value 0.14 sufficiently greater than $\sin(9/2)° = 0.07846$, the level of the spot due to the primary diffraction takes a value which is about 0.6% of the peak level of the main spot, which enables one to neglect the influence of the crosstalk with respect to the adjacent tracks of the optical disk. Furthermore, for example, for $\theta_{11} = 12°$, $\sin(\theta_{11}/2) = 0.10453$. Also in this case, when the numerical aperture NA of the collimate lens 3 is 0.14, the level of the spot due to the primary diffraction takes a value which is about 0.7% of the level of the main spot, which enables one to neglect the influence of the crosstalk with respect to the adjacent tracks of the optical disk. That is, as shown in FIG. 4B, when compared with a case where an apodized filter is employed, the level of the spot due to the primary diffraction can be reduced at least by the same magnitude. In addition, as shown in FIG. 3B, when the numerical aperture NA of the collimate lens 3 is 0.2, the intensity level of the main spot develops the maximum value. However, when the numerical aperture NA of the collimate lens 3 is set to at least 0.2, the spot diameter is increased, which causes the degree of modulation to be deteriorated and may lead to the crosstalk associated with the adjacent tracks. Consequently, the optimal range of the numerical aperture of the collimate lens 3 is $0.14 < NA < 0.2$.

Furthermore, when comparing the graphs respectively of FIGS. 3B and 4B, when the level of the spot due to the primary diffraction is 0, the spot diameter is 1.61 for the intensity of the spot = 0.6 in the conventional example of FIG. 4B; whereas the spot diameter is 1.54 for the intensity of the main spot = 1.64 according to the example of the present invention of FIB. 3B. According to the present invention, when compared with the case employing the conventional apodized filter, the spot intensity is increased to be 2.7 times the original value and the spot diameter is reduced by about 5%. As a result, modulation and the S/N ratio are improved.

As described above, according to the present invention, the crosstalk with respect to the adjacent tracks due to the spot associated with the primary diffraction can be prevented without employing the apodized filter. Furthermore, as compared with the case using the apodized filter, the S/N ratio can be improved.

While the present invention has been described with reference to the particular illustrative embodiments, it is not restricted by those embodiments but only by the appended claims. It is to be appreciated that those skilled in the art can change and modify the embodiments without departing from the scope and spirit of the present invention.

What is claimed is:

1. An optical apparatus for use in an optical pickup for preventing crosstalk between adjacent tracks on the surface of an optical disk comprising:
   a semiconductor laser for emitting a light beam;
   a collimate lens to obtain a parallel beam from the light beam emitted from the semiconductor laser;
   an objective for focusing the parallel beam onto the surface of the optical disk;
   a light receiving element for detecting a light reflected from the surface of the optical disk having pits formed thereon arranged along the tracks for recording a signal;
   wherien a first angular width of the light beam emitted from the laser and incident on the collimate lens in a first direction at an intensity half of maximum intensity is in the range of 9° to 12°; a second angular width of the beam emitted from the laser and incident on the collimate lens in a second direction perpendicular to the first direction at an intensity half of maximum intensity is about three times the value of the first angular width, and a numeric aperture value of said collimate lens is in the range of 0.14 to 0.2; and wherein a diameter of a spot formed by the parallel light on the surface is about 1.5 μm, thereby focusing the spot on a single track on the surface.

2. An optical apparatus according to claim 1, wherein a distribution of an amount of light of the parallel beam obtained from the collimate lens is a Gaussian distribution.

3. An optical apparatus according to claim 1, wherein a diffraction grid having no apodizing filter is in an optical path between the laser and the collimating laser.

* * * * *